United States Patent [19]

Körtgen

[11] Patent Number: 4,792,127
[45] Date of Patent: Dec. 20, 1988

[54] FRICTION DAMPER

[75] Inventor: Bernd Körtgen, Adenau, Fed. Rep. of Germany

[73] Assignee: Stabilus GmbH, Koblenz-Neuendorf, Fed. Rep. of Germany

[21] Appl. No.: 82,796

[22] Filed: Aug. 6, 1987

[30] Foreign Application Priority Data

Aug. 16, 1986 [DE] Fed. Rep. of Germany ....... 3627816

[51] Int. Cl.$^4$ .................... F16F 7/08; D06F 37/20
[52] U.S. Cl. .................... 267/64.15; 267/64.26; 188/119; 188/271; 188/322.16; 188/322.22
[58] Field of Search .................... 267/64.15, 64.26, 120, 267/64.11, 64.12; 188/119, 271, 129, 381, 300, 322.16, 322.19, 322.22; 74/531, 18.2; 403/372, 371

[56] References Cited

U.S. PATENT DOCUMENTS 2,912,069 11/1959 Dillenburger .................. 188/322.22
4,310,148 1/1982 Freitag ............................. 267/120
4,702,463 10/1987 Krautkramer .................. 267/64.26

FOREIGN PATENT DOCUMENTS 2602620 7/1977 Fed. Rep. of Germany .
2706884 10/1977 Fed. Rep. of Germany ...... 188/300

Primary Examiner—Andres Kashnikow
Assistant Examiner—Mark T. Le
Attorney, Agent, or Firm—Brumbaugh, Graves, Donohue & Raymond

[57] ABSTRACT

In a friction damper a core part is telescopically movable in an outer part. A friction piston is secured to the core part. The friction piston is pot-shaped and includes a basic body and skirt segments. The skirt segments are integral with the basic body and are held by a spring system in frictional contact with the inner surface of the outer part.

24 Claims, 4 Drawing Sheets

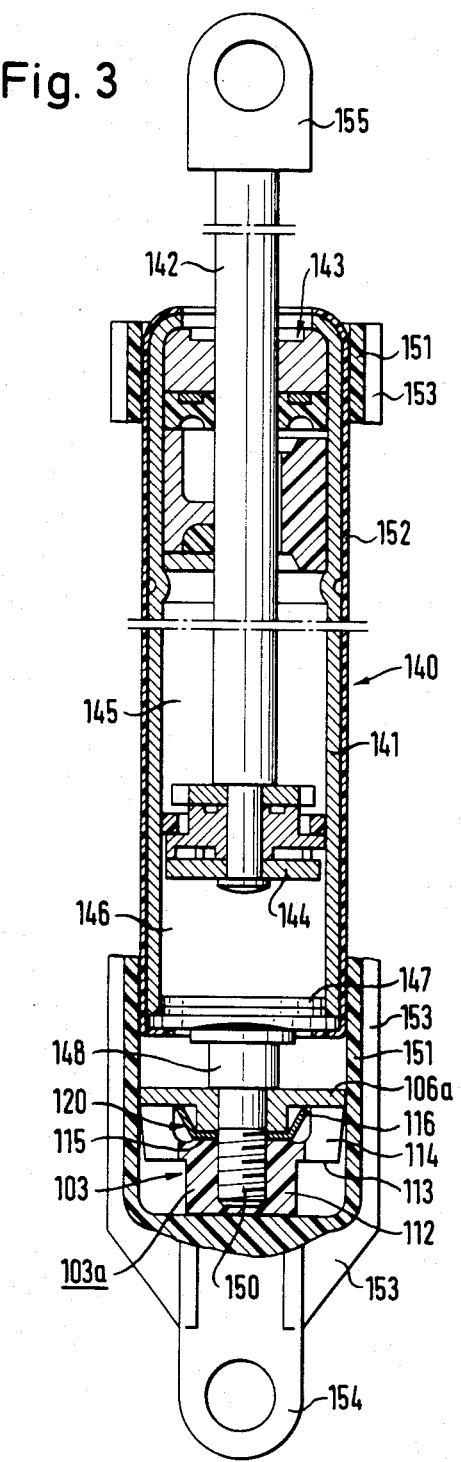

FRICTION DAMPER

BACKGROUND OF THE INVENTION

The invention relates to a friction damper comprising an outer part with a cavity defined by an inner cylindrical surface, a core part telescopically movable in relation to the outer part in the direction of an axis of the cylindrical surface and a friction piston construction group on the core part, which is in frictional engagement with the cylindrical inner surface of the outer part, where the friction piston construction group comprises a plurality of friction elements distributed about the axis and these friction elements are stressed into frictional engagement with the inner surface by a radially acting spring system.

Such friction dampers are used for various fields of application. By way of example they can be used as parts of gas springs which are in use to counter-balance boot lids or engine bonnets in motor vehicles. Furthermore such friction dampings can be used for vibration damping in washing machines.

INFORMATION ON THE PRIOR ART

From Fed. German OS No. 2,602,620 a friction damper is known in which a piston rod is introduced through the one end of a cylinder and carries a friction piston construction group within the cylinder. In this case the friction piston construction group consists of three friction piston elements distributed over the circumference of the piston rod, which are individually connected with the piston rod and carry friction linings on their outsides. An annular spring presses the friction piston elements against the inner surface of the cylinder. The friction linings must be secured on the friction piston elements for example by sticking. Thus this known friction damper consists of a plurality of individual parts which are dear in production and require expensive assembly.

OBJECT OF THE INVENTION

It is the object of the invention to produce a friction damper which is as simple as possible in construction and comprises a small number of easily producible parts worth their price. Furthermore construction should be simple and a constant damping effect should be guaranteed over a long working time.

SUMMARY OF THE INVENTION

The invention is based upon a friction damper comprising an outer part with a cavity defined by an inner cylindrical surface, a core part movable telescopically in relation to the outer part in the direction of an axis of that surface and a friction piston construction group on the core part and in frictional engagement with the cylindrical inner surface of the outer part, where the friction piston construction group comprises a plurality of friction elements distributed about the axis and these friction elements are stressed into frictional engagement with the inner surface by a radially acting spring system.

In such a friction damper it is proposed that the friction elements are formed by skirt segments of a pot-shaped friction piston which are separated from one another by slots and are integral with a basic body, common to them, of the pot-shaped friction piston.

The invention provides a very simple construction of the friction damper which can be produced easily and causes no difficulty of any kind in assembly. The skirt segments act directly upon the inner cylindrical surface of the outer part, without having to be provided with specific friction linings. Naturally it is not impossible for the skirts segments to be provided with a friction-favouring coating. Such a coating can easily be applied to the skirt segments. However it is also conceivable for the friction piston to consist of a material which itself develops an adequate friction effect, that is, without coating. For example the friction piston can consist of synthetic plastics material, especially elastomer synthetic plastics material, or rubber, and the material of the friction piston can be filled with a friction-increasing filler to increase the friction.

According to a further development of the invention it is provided that the spring system rests on the skirt segments close to their ends remote from the basic body. This measure has the effect that the spring achieves the maximum possible initial stress force.

According to a preferred form of embodiment it is provided that the radially acting spring system is formed by at least one star spring with a central part and several spring tongues, the central part lying on the inner side of the basic body of the pot-shaped friction piston and the spring tongues lying radially inwards on the skirt segments of the pot-shaped friction piston. In this form of embodiment assembly becomes especially simple, since both the spring system and the friction piston can be secured centrally to the core part. In order to achieve as effective a springing as possible it is advisable for the star spring to be made pot-shaped with the spring tongues directed away from the basic body. The spring tongues in this case can include with the central part an angle exceeding 90°, perhaps an angle of more than 120°.

One or more spring tongues can be permitted to abut on each one skirt segment. The alternative with several spring tongues per skirt segment ensures that less attentiveness must be devoted to an angle adjustment of the star spring, in relation to the friction piston. The central part of the star spring can rest directly or indirectly on a central projection of the basic body of the pot-shaped piston. The optimum position of the spring tongues in relation to the skirt segments can be set by the dimensioning of this central projection in the axial direction.

In order to make the friction force as independent as possible of the inherent resilience of the skirt segment, that is to generate a friction force defined by the springing, it is proposed that the skirt segments are connected with the basic body each through a connection point of reduced cross-section. The reduced cross-section may be obtained in that the skirt segments possess a slighter radial width at the points of connection with the basic body than at their free ends.

The fitting of the friction piston construction group on the core part becomes especially simple in that the basic body of the pot-shaped friction piston and the central part of the star spring, lying against one another in sandwich manner, are secured, especially riveted, in common on an extension piece of the core part.

In order to avoid damage to the friction piston group in running against an end wall, if present, of the outer part it is proposed that a guard washer is fitted on at least one axially directed end face of the pot-shaped friction piston. This guard washer too can be secured in common with the friction piston and the spring system on an extension of the core part.

The friction force can be varied for example in that several star springs are arranged in stacked manner one above another. Another possibility for the adjustment of the friction force consists in that a shim rests on the inside of the pot bottom of the star spring of pot-shaped formation. In this latter form of embodiment the pressure application effect of the spring tongues can be influenced especially by the fact that the shim acts with its radially outer marginal portion upon the spring tongues. The shim too, in common with the star spring and the friction piston and possibly also in common with a guard washer can be secured on an extension of the core part.

In a first case of utilisation of the friction damper it is provided that the outer part is formed by the cylinder of a cylinder-piston unit and the core part is formed by a piston rod of the cylinder-piston unit, the piston rod being conducted in sealed manner through at least one end part of the cylinder and the interior space of the cylinder being filled with a fluid. The slots can here form by-pass passages between two working chambers which are formed within the cylinder on both sides of the friction piston construction group. With such a form of embodiment a fluid damping and a mechanical friction damping can be effected in combination. The fluid can be formed at least partially by gas under pressure, so that the cylinder-piston unit generates an outward thrust force.

In another form of embodiment the core part is formed by the cylinder of a cylinder-piston unit and the outer part by a telescope tube guided externally on the cylinder. In this case the cylinder-piston unit can itself again be formed as a compressed-gas spring.

The connection point between the basic body of the friction piston and the skirt segments must naturally be so dimensioned that the friction force in each case can be transmitted reliably by way of these connection points.

The various characteristic features of the invention are listed especially in the claims, which form a part of the disclosure. For better understanding of the invention, its advantages and specific effects reference is made to the accompanying drawings and to the following description by way of example, in which preferred forms of embodiment of the invention are represented and described.

BRIEF DESCRIPTION OF THE DRAWINGS

The invention will be described hereinafter in detail with reference to the forms of embodiment which are illustrated in the drawings, wherein:

FIG. 3 represents a friction damper according to the invention in connection with a gas spring, but arranged outside the gas spring cylinder;

DETAILED DESCRIPTION OF REPRESENTATIVE EMBODIMENTS

Figure 1:
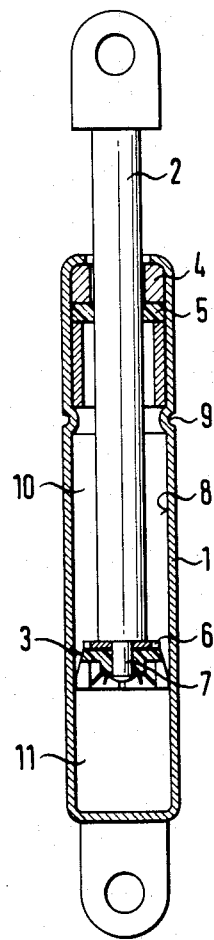
FIG. 1 represents a gas spring with friction damper according to the invention in longitudinal section.
Figure 2:
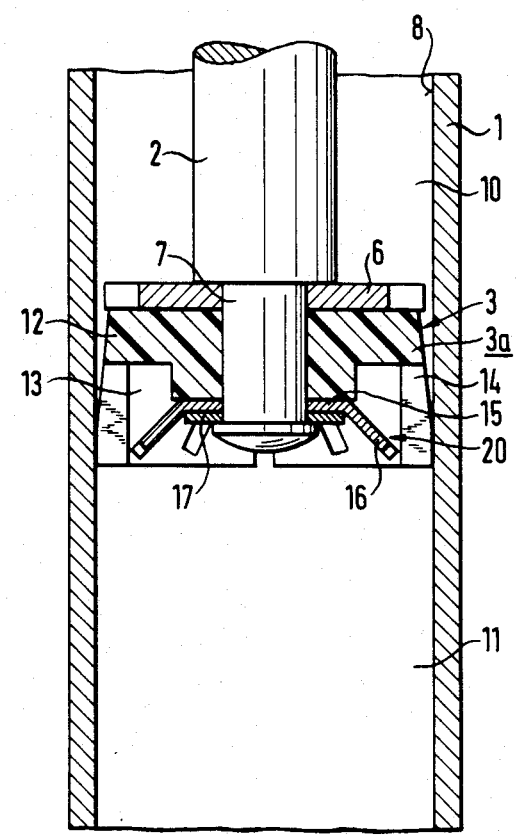
FIG. 2 represents an enlarged longitudinal section of FIG. 1 in the region of the friction piston construction group.
Figure 2A:
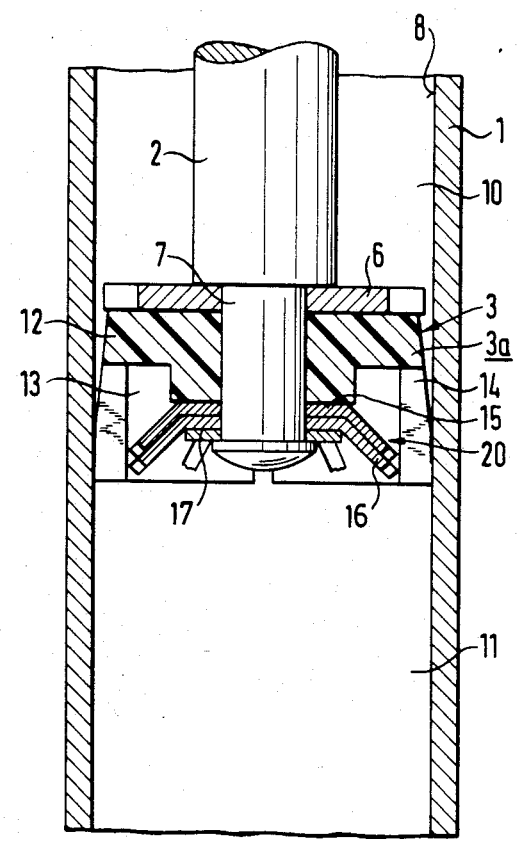
FIG. 2a represents an enlarged longitudinal section of another embodiment of the invention in the region of the friction piston construction group.

The friction damper is shown in FIGS. 1 and 2 by the example of a gas spring. For specific installation cases it is desirable for the gas spring to possess a defined friction. The friction damper comprises a cylindrical housing 1, against the inner wall 8 of which a friction piston construction group 3 connected with a piston rod 2 is pressed. At the upper end of the cylindrical housing 1 the piston rod 2 is guided by means of a piston rod guide 4 and sealed to the exterior by a piston rod seal 5. The interior of the cylindrical housing 1 has a gas filling under pressure and is divided by the friction piston construction group 3 into two working chambers 10 and 11, the friction piston construction group 3 being secured together with a guard washer 6 on a piston rod extension 7. For the limitation of the outward thrust movement of the piston rod 2 the guard washer 6 comes to abut on a component fast with the cylinder - in the present case on a corrugation 9 - of the cylindrical housing 1. A friction piston 3a of pot-shaped formation consists of a basic body 12 and skirt segments 13 which are formed by unilaterally open axial slots 14. A star spring 20 consists of a central part 15 and several outwardly pointing spring tongues 16 which extend at an angle to the axis of the friction damper and press internally upon the skirt segments 13. This star spring 20 is secured together with a shim 17 and with the friction piston 3a and the guard washer 6 on the piston rod extension 7 of the piston rod 2, whereby a pre-assemblable construction unit is formed. The pressure application force with which the skirt segments 13 are pressed against the inner wall 8 of the cylindrical housing 1 is determined by appropriate design of the star spring 20. Thus by way of example the pressure application force can be influenced by appropriate selection of the external diameter of the shim 17, or several star springs with appropriate spring tongues can be stacked one upon another and united into a spring pack as shown in FIG. 2a. The guard washer 6 has the effect that the friction piston 3a is not damaged in striking upon the corrugation, while the axial slots 14 take over nozzle functions so that a gas exchange can take place between the working chambers 10 and 11.

The friction piston 3a as shown in FIGS. 1 and 2 comprises skirt segments 13 formed integrally with the basic body 12, and this friction piston 3a preferably consists of a synthetic plastics injection moulding. In order to keep the inherent resilience of the skirt segments 13 low, their wall thickness is at the minimum in the region of the basic body 12. However the wall thickness must be so selected that the friction force can be reliably transmitted by the cross-section of transition of the skirt segments 13 to the basic body 12.

In FIG. 3 there is represented a further example of application for a friction damper according to the invention. One sees here a gas spring 140 with a cylinder 141 and a piston rod 142. The piston rod 142 is conducted out through a guide and seal unit 143 at one end of the cylinder 141 and carries a piston unit 144 within the cylinder 141. The interior of the cylinder 141 is filled with gas under pressure. The compressed gas seeks to push the piston rod 142 out of the cylinder 141. The movement of the piston rod 142 is pneumatically damped by the piston unit 144. For this purpose the piston unit 144 comprises passage openings which connect the two working chambers 145 and 146 with one another, the cross-section of these connection passages being dependent upon the direction of movement of the piston rod 142, so that the outward thrust movement of the piston rod is more damped than the inward thrust movement of the piston rod. At its end remote from the piston rod the cylinder 141 has a closure plate 147. A journal 148 is welded on to this closure plate 147. This journal 148 carries a friction piston construction group 103 with a friction piston 103a. The friction piston 103a consists of a basic body 112 and skirt segments 113, which are separated from one another by slots 114, but are integral with the basic body 112. A star spring 120 bears with a central part 115 and spring tongues 116 on the basic body. The friction piston 103a is secured together with the star spring 120 and a guard washer 106a on the journal 148, namely due to the fact that a threaded section 150 of the journal 148 is screwed into the basic body 112. The friction piston construction group 103 is accommodated within a telescope tube 151 which is guided in telescopically sliding manner on the outside of the cylinder 141. The cylinder 141 is enclosed by a shrunk-on hose piece 152 on which the telescope tube 151 slides. The telescope tube 151 consists of synthetic plastics material and is stiffened by ribs 153. The friction piston construction group 103 co-operates with the inner surface of the telescope tube 151 exactly as in the form of embodiment according to FIGS. 1 and 2 the friction piston construction group 3 co-operates with the inner surface 8 of the cyinder 1. The telescope tube 151 carries a joint eye 154 at its end. A further joint eye 155 is fitted on the piston rod 142. The appliance according to FIG. 3 can be installed for example between an engine bonnet and the bodywork of a motor vehicle. The gas spring 140 then acts over a specific stroke range as compensation for the weight of the engine bonnet. The normal opening stroke of the engine bonnet is determined by the stroke of the piston rod 142 in relation to the cylinder 141. If moreover a more extensive opening of the engine bonnet is desired, then the telescope tube 151 shifts in relation to the cylinder 141. This displacement is damped by the cooperation of the friction piston construction group 103 with the telescope tube 151, so that the engine bonnet can not fall back suddenly.

Specific forms of embodiment of the invention have been shown and described in order to explain the use of the principle of the invention. Of course the invention can also be developed in other ways without departure from the principle.

The reference numerals in the claims are used only to facilitate understanding, and are not to be understood as a limitation.

I claim:

1. A friction damper comprising an outer part (1) having a cavity (10, 11) limited by an internal cylindrical surface (8), a core part (2) telescopically movable in relation to the outer part (1) in the direction of an axis of the cylindrical surface (8) and a friction piston construction group (3) on the core part (2), which group (3) is in frictional engagement with the cylindrical inner surface (8) of the outer part (1), wherein the improvement comprises said friction piston construction group (3) comprising a plurality of friction elements (13) distributed about said axis, the friction elements (13) being formed by skirt segments (13) of a pot-shaped friction piston (3a) which are separated from one another by slots (14) and are integral with a common basic body (12) of the pot-shaped friction piston (3a), said friction elements (13) being stressed by a radially acting spring system (20) into frictional engagement with the inner surface (8), and said radially acting spring system (20) being formed by at least one star spring (20) having a central part (15) and plurality of spring tongues (16), said central part (15) lying on the inner side of the basic body (12) of the pot-shaped friction piston (3a) and said spring tongues (16) acting radially against the skirt segments (13) of the pot-shaped friction piston (3a).

2. Friction damper according to claim 1, characterised in that several spring tongues (16) act on each one skirt segment (13).

3. Friction damper according to claim 1, characterised in that the skirt segments (13) possess a smaller radial width at the points of connection with the basic body (12) than at their free ends.

4. Friction damper according to claim 1, characterised in that a plurality of star springs (20) are arranged in stack manner one above another.

5. Friction damper according to claim 1 characterized in that said friction piston (3a) is composed of an elastomeric material.

6. Friction damper according to claim 1, characterised in that the basic body (12) of the pot-shaped friction piston (3a) and the central part (15) of the star spring (20) are secured against one another in sandwich manner on an extension (7) of the core part (2).

7. Friction damper according to claim 1, characterised in that a guard washer (6) is fitted on at least one axially directed end face of the pot-shaped friction piston (3a).

8. Friction damper according to claim 7, characterised in that the guard washer (6) is secured in common with the friction piston (3a) and the spring system (20) on an extension (7) of the core part (2).

9. Friction damper according to claim 1, characterised in that the core part is formed by the cylinder (141) of a cylinder-piston unit (140) and the exterior part is formed by a telescope tube (151) guided externally on the cylinder (141).

10. Friction damper according to claim 9, characterised in that the cylinder-piston unit (140) is formed as a compressed-gas spring.

11. Friction damper according to claim 1, characterised in that the outer part (1) is formed by the cylinder (1) of a cylinder-piston unit and the core part (2) is formed by a piston rod (2) of the cylinder-piston unit, while the piston rod (2) is guided in sealing manner through at least one end part (4, 5) of the cylinder (1) and the interior (10, 11) of the cylinder (1) is filled with a fluid.

12. Friction damper according to claim 11, characterised in that the slots (14) form by-pass passages between two working chambers (10, 11) which are formed within the cylinder (1) on both sides of the friction piston construction group (3).

13. Friction damper according to claim 11, characterised in that the fluid is formed at least partly from gas under pressure.

14. Friction damper according to claim 1, characterised in that the central part (15) of the star spring (20) acts on a central projection of the basic body (12) of the pot-shaped friction piston (3a).

15. Friction damper according to claim 1, characterised in that the skirt segments (13) are connected with the basic body (12) each through a connection point of reduced cross-section.

16. Friction damper according to claim 1, characterised in that the spring system (20) acts on the skirt segments (13) close to their ends remote from the basic body (12).

17. Friction damper according to claim 1, characterised in that one spring tongue (16) acts on each one skirt segment (13).

18. Friction damper according to claim 1, characterised in that the star spring (20) is of pot-shaped formation with the spring tongues (16) directed away from the basic body (12).

19. Friction damper according to claim 18, characterised in that the spring tongues (16) include with the central part (15) of angle exceeding 90°.

20. Friction damper according to claim 19, characterised in that the angle between the central part (15) and the spring tongues (16) is greater than 120°.

21. Friction damper according to claim 18, characterised in that a shim (17) rests on the pot bottom interior of the star spring (20) of pot-shaped formation.

22. Friction damper according to claim 21, characterised in that the shim (17) acts with its radially outer margin upon the spring tongues (16).

23. Friction damper according to claim 21, characterized in that the shim (17) is secured, in common with the star spring (20) and the friction piston (3a), on an extension (7) of the core part (2).

24. Friction damper according to claim 21, characterized in that the shim (17) is secured in common with the star spring (20), the friction piston (3a) and a guard washer (6) on an extension (7) of the core part (2).

* * * * *